US011683528B2

(12) United States Patent
Seregin et al.

(10) Patent No.: US 11,683,528 B2
(45) Date of Patent: Jun. 20, 2023

(54) SUB-PICTURE EXTRACTION AND CONSTRAINTS IN VIDEO CODING

(71) Applicant: QUALCOMM Incorporated, San Diego, CA (US)

(72) Inventors: Vadim Seregin, San Diego, CA (US); Yong He, San Diego, CA (US); Yao-Jen Chang, San Diego, CA (US); Muhammed Zeyd Coban, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 141 days.

(21) Appl. No.: 17/314,959

(22) Filed: May 7, 2021

(65) Prior Publication Data

US 2021/0352330 A1 Nov. 11, 2021

Related U.S. Application Data

(60) Provisional application No. 63/023,044, filed on May 11, 2020.

(51) Int. Cl.
*H04N 19/70* (2014.01)
*H04N 19/184* (2014.01)
*H04N 19/30* (2014.01)
*H04N 19/105* (2014.01)
(Continued)

(52) U.S. Cl.
CPC .......... *H04N 19/70* (2014.11); *H04N 19/105* (2014.11); *H04N 19/172* (2014.11); *H04N 19/174* (2014.11); *H04N 19/184* (2014.11); *H04N 19/30* (2014.11)

(58) Field of Classification Search
CPC .............................. H04N 19/119; H04N 19/70
See application file for complete search history.

(56) References Cited

U.S. PATENT DOCUMENTS

| 2020/0228843 | A1* | 7/2020 | Lin ..................... H04N 19/70 |
| 2020/0288168 | A1* | 9/2020 | Zhang ................ H04N 19/189 |
| 2020/0296365 | A1* | 9/2020 | Chen .................. H04N 19/182 |

(Continued)

OTHER PUBLICATIONS

Hannuksela et al. ("AHG12: Sub-picture-based picture partitioning and decoding", JVET-N0046, Joint Video Experts Team (JVET) of ITU-T SG 16 WP 3 and ISO/IEC JTC 1/SC 29/WG 11, 14th Meeting: Geneva, CH, Mar. 19-27, 2019.*

(Continued)

*Primary Examiner* — Fabio S Lima
(74) *Attorney, Agent, or Firm* — Shumaker & Sieffert, P.A.

(57) ABSTRACT

Example techniques and devices for decoding video data are disclosed. An example device includes memory configured to store the video data and one or more processors implemented in circuitry and communicatively coupled to the memory. The one or more processors are configured to extract a current sub-picture from a bitstream of the video data and parse virtual boundary syntax elements indicative of virtual boundaries for a current picture, wherein the current sub-picture is associated with the current picture. The one or more processors are configured to update the virtual boundaries based at least in part on the virtual boundary syntax elements and decode the current sub-picture based on the updated virtual boundaries.

35 Claims, 7 Drawing Sheets

(51) Int. Cl.
   *H04N 19/174*   (2014.01)
   *H04N 19/172*   (2014.01)

(56) References Cited

U.S. PATENT DOCUMENTS

| | | | | |
|---|---|---|---|---|
| 2021/0306626 | A1* | 9/2021 | Choi | H04N 19/136 |
| 2022/0224932 | A1* | 7/2022 | Lim | H04N 19/46 |
| 2022/0321922 | A1* | 10/2022 | Kim | H04N 19/593 |

OTHER PUBLICATIONS

Choi ("AHG12: Sub-picture-based picture partitioning and decoding", JVET-N0046, Joint Video Experts Team (JVET) of ITU-T SG 16 WP 3 and ISO/IEC JTC 1/SC 29/WG 11, 14th Meeting: Geneva, CH, Mar. 19-27, 2019).*

Karczewicz et al. ("AHG12: Sub-picture-based picture partitioning and decoding", JVET-N0046, Joint Video Experts Team (JVET) of ITU-T SG 16 WP 3 and ISO/IEC JTC 1/SC 29/WG 11, 14th Meeting: Geneva, CH, Mar. 19-27, 2019.*

Choi (Tencent) B., et al., "AHG9/AHG12: On Signalling of Subpicture ID", 130. MPEG Meeting, Apr. 20, 2020-Apr. 24, 2020, Alpbach, (Motion Picture Expert Group or ISO/IEC JTC1/SC29/WG11), No. m53093, JVET-R0126, Apr. 4, 2020 (Apr. 4, 2020), XP030285960, pp. 1-2, Retrieved from the Internet: URL: http://phenix.int-evry.fr/mpeg/doc_end_user/documents/130_Alpbach/wg11/m53093-JVET-R0126-v1-JVET-R0126onsignalingofsubpictureiD. zip JVET-R0126 On signaling of subpicture ID.docx [retrieved on Apr. 4, 2020].

Hannuksela M.M., et al., "AHG12: Sub-Picture-Based Picture Partitioning and Decoding", 14. JVET Meeting, Mar. 19, 2019-Mar. 27, 2019, Geneva, (The Joint Video Exploration Team of ISO/IEC JTC1/SC29/WG11 and ITU-1 SG.16), No. JVET-N0046, JVET-N0046, Mar. 13, 2019 (Mar. 13, 2019), 4 Pages, XP030202783, Retrieved from the Internet: URL:http://phenix.int-evry.fr/jvet/doc_end_user/documents/14_Geneva/wg11/JVET-N0046-v1.zip, JVET-N0046.docx [retrieved on Mar. 13, 2019].

International Search Report and Written Opinion—PCT/US2021/031566—ISA/EPO—date Dec. 23, 2021 28 Pages.

Seregin (Qualcomm) V., et al., AHG12: On Motion Compensation for Sub-Pictures, 17. JVET Meeting; Jan. 7, 2020-Jan. 17, 2020; Brussels; (The Joint Video Exploration Team of ISO/IEC JTC1/SC29/WG11 and ITU-T SG.16), No. JVET-Q0157, m51746, Dec. 29, 2019 (Dec. 29, 2019), pp. 1-5, XP030222724, Retrieved from the Internet: URL: http://phenix.int-evry.fr/jvet/doc_end_user/documents/17_Brussels/wg11/JVET-Q0157-v1.zip JVET-Q0157.docx [retrieved on Dec. 29, 2019].

Seregin V., et al., "AHG9: On IRAP NAL Constraint for Reordered Sub-Pictures", 130. MPEG Meeting, Apr. 20, 2020-Apr. 24, 2020, Alpbach, (Motion Picture Expert Group or ISO/IEC JTC1/SC29/WG11), No. m53253, JVET-R0276, Apr. 4, 2020 (Apr. 4, 2020), XP030286346, 1 Pages, Retrieved from the Internet: URL:http://phenix.int-evry.fr/mpeg/doc_end_user/documents/130_Alpbach/wq11/m53253-JVET-R0276-v1-JVET-R0276.zip, JVET-R0276.docx [retrieved on Apr. 4, 2020].

Seregjin (Qualcomm) V., et al., "AHG9: On Sub-Picture Constraints", 131. MPEG Meeting, Jun. 29, 2020-Jul. 3, 2020, Online, (Motion Picture Expert Group or ISO/IEC JTC1/SC29/WG11), No. m54111, JVET-S0125, May 23, 2020 (May 23, 2020), XP030289747, 4 Pages, Retrieved from the Internet: URL:http://phenix.int-evry.fr/mpeg/doc_end_user/documents/131_Teleconference/wg11/m54111-JVET-S0125-v1-JVET-S0125.zip JVET-S0125.docx [retrieved on May 23, 2020].

Chen J., et al., "Algorithm Description of Joint Exploration Test Model 1", Joint Video Exploration Team (JVET) of ITU-T SG 16 WP 3 and ISO/IEC JTC 1/SC 29/WG 11, 1st Meeting: Geneva, CH, Oct. 19-21, 2015, No. H.266, JVET-A1001, Feb. 24, 2016 (Feb. 24, 2016), XP030150000, 27 Pages, URL: http://phenix.int-evry.fr/jvet/.

ITU-T H.265: "Series H: Audiovisual and Multimedia Systems, Infrastructure of Audiovisual Services—Coding of Moving Video, High Efficiency Video Coding", The International Telecommunication Union, Jun. 2019, 696 Pages.

Partial International Search Report—PCT/US2021/031566—ISA/EPO—dated Sep. 23, 2021.

Seregin V., et al., "AHG9: On Sub-Picture Constraints", JVET-S0125-v2, Joint Video Experts Team (JVET) of ITU-T SG 16 WP 3 and ISO/IEC JTC 1/SC 29/WG 11, 19th Meeting: by teleconference, Jun. 22-Jul. 1, 2020, pp. 1-6.

Seregin V., et al., "AHG9: On Subpicture Constraints", JVET-S0258, Joint Video Experts Team (JVET) of ITU-T SG 16 WP 3 and ISO/IEC JTC 1/SC 29/WG 11, 19th Meeting: by teleconference, Jun. 22-Jul. 1, 2020, pp. 1-4.

Bross B., et al., "Versatile Video Coding (Draft 9)," 130th MPEG Meeting, 18th JVET Meeting, Apr. 15, 2020-Apr. 24, 2020, Alpbach, (Motion Picture Expert Group or ISO/IEC JTC1/SC29/WG11 and JVET of ITU-T SG 16 WP 3 and ISO/IEC JTC 1/SC 29/WG 11), No. m53983, JVET-R2001, May 6, 2020 (May 6, 2020), XP030287934, 524 pages, Retrieved from the Internet: URL: http://phenix.int-evry.fr/mpeg/doc_end_user/documents/130_Alpbach/wg11/m53983-JVET-R2001-v8-JVET-R2001-v8.zip JVET-R2001-v8.docx [retrieved on May 6, 2020].

He (Qualcomm) Y., et al., "AHG9: On Subpicture Sub-Bitstream Extraction", 131, MPEG Meeting, Jun. 29, 2020-Jul. 3, 2020, Online, (Motion Picture Expert Group or ISO/IEC JTC1/SC29/WG11) No. M54103, 19th Meeting: by teleconference, Jun. 22-Jul. 1, 2020, JVET-S0117-v2, Jun. 16, 2020 (Jun. 16, 2020), XP030288283, pp. 1-3, Retrieved from the Internet: URL: http://phenix.int-evry.fr/mpeg/doc_end_user/documents/131_Teleconference/wg11/m54103-JVET-S0117-v2-JVET-S0117.zip. JVET-S0117-v2.docx [Retrieved on Jun. 16, 2020].

Chiu C.Y., et al., "AHG9: On Signalling of Virtual Boundary", 17, JVET Meeting, Jan. 7, 2020-Jan. 17, 2020, Brussels, (The Joint Video Exploration Team of ISO/IEC JTC1/SC29/WG11 and ITU-T SG.16), No. JVET-Q0181, m51770, Jan. 7, 2020 (Jan. 7, 2020), XP030222814, 6 Pages, Retrieved from the Internet: URL: http://phenix.int-evry.fr/jvet/doc_end_user/documents/17_Brussels/wg11/JVE I -Q0181-v2.zip. JVET-Q0181-v2.docx. [Retrieved on Jan. 7, 2020].

Drugeon (Panasonic) V., "AHG12: Subpictures and Conformance Cropping Window", 130. MPEG Meeting, Apr. 20, 2020-Apr. 24, 2020, Alpbach, (Motion Picture Expert Group or ISO/IEC JTC1/SC29/WG11) No. m53060, JVET-R0093, Apr. 2, 2020 (Apr. 2, 2020), XP030285882, Retrieved from the Internet: URL: http://phenix.int-evry.fr/mpeg/doc_end_user/documents/130_Alpbach/wg11/m53060-JVET-R0093-v1-JVET-R0093_v1.zip. JVET-R0093.docx [Retrieved on Apr. 2, 2020].

Choi (Tencent) B., et al., "AHG9/AHG12: Virtual Boundary Signalling with Subpictures", 130, MPEG Meeting, Apr. 20, 2020-Apr. 24, 2020, Alpbach, (Motion Picture Expert Group or ISO/IEC JTC1/SC29/WG11), No. M53088, JVET-R0121, Apr. 3, 2020 (Apr. 3, 2020), XP030285955, Retrieved from the Internet: URL: http://phenix.int-evry.fr/mpeg/doc_end_user/documents/130_Alpbach/wg11/m53088-JVET-R0121-v1-JVET-R0121Virtualboundarysignalingwithsubpictures.zip. JVET-R0121, [Retrieved on Apr. 3, 2020].

* cited by examiner

SUB-PICTURE EXTRACTION AND CONSTRAINTS IN VIDEO CODING

This application claims priority to U.S. Provisional Patent Application No. 63/023,044, filed May 11, 2020, the entire content of which is incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for coding video data and in particular to sub-picture extraction, sub-picture reference picture list (RPL) constraints, and sub-picture reordering constraints.

When a sub-picture is extracted from a picture having virtual boundaries, the virtual boundaries may be located outside of the sub-picture. This may cause decoding errors which may negatively affect decoding quality.

In one example, a method includes extracting a current sub-picture from a bitstream of the video data, parsing virtual boundary syntax elements indicative of virtual boundaries for a current picture, the current sub-picture being associated with the current picture, updating the virtual boundaries based at least in part on the virtual boundary syntax elements, and decoding the current sub-picture based on the updated virtual boundaries.

In another example, a device includes memory configured to store the video data, and one or more processors implemented in circuitry and communicatively coupled to the memory, the one or more processors being configured to: extract a current sub-picture from a bitstream of the video data; parse virtual boundary syntax elements indicative of virtual boundaries for a current picture, wherein the current sub-picture is associated with the current picture; update the virtual boundaries based at least in part on the virtual boundary syntax elements; and decode the current sub-picture based on the updated virtual boundaries.

In another example, a non-transitory computer-readable storage medium is encoded with instructions that, when executed, cause one or more processors to extract a current sub-picture from a bitstream of the video data, parse virtual boundary syntax elements indicative of virtual boundaries for a current picture, wherein the current sub-picture is associated with the current picture, update the virtual boundaries based at least in part on the virtual boundary syntax elements, and decode the current sub-picture based on the updated virtual boundaries.

In another example, a device includes means for extracting a current sub-picture from a bitstream of the video data, means for parsing virtual boundary syntax elements indicative of virtual boundaries for a current picture, wherein the current sub-picture is associated with the current picture, means for updating the virtual boundaries based at least in part on the virtual boundary syntax elements, and means for decoding the current sub-picture based on the updated virtual boundaries.

The details of one or more examples are set forth in the accompanying drawings and the description below. Other features, objects, and advantages will be apparent from the description, drawings, and claims.

DETAILED DESCRIPTION

Some example devices and draft video coding standards may support the use of virtual boundaries for pictures and may support the treating (e.g., processing) of a sub-picture as a picture. When a sub-picture is treated (e.g., processed) as a picture, a video decoder may extract the sub-picture and decode the sub-picture independently from another sub-picture within a same picture. When a video decoder extracts a sub-picture from a picture having virtual boundaries, the virtual boundaries may be outside of the sub-picture. This may cause decoding errors which may negatively affect the quality of the decoded video.

Additionally, some draft video coding standards contain reference picture list constraints. These reference picture list constraints may not accommodate a use case where a picture with multiple sub-pictures is predicted from an inter-layer reference picture with only one sub-picture.

Furthermore, some draft video coding standards do not require a sub-picture to be treated as a picture when sub-picture reordering occurs. This may cause a decoding mismatch which may negatively affect the quality of the decoded video.

According to the techniques of this disclosure, virtual boundaries of a picture may be updated when a sub-picture of a picture having virtual boundaries is extracted. Also, reference picture list constraints may be changed to accommodate the use case where a picture with multiple sub-pictures is predicted from an inter-layer reference picture with only one sub-picture. Additionally, a constraint may be added such that when a sub-picture is reordered, the sub-picture is treated as a picture. Such techniques may improve decoding quality and/or improve decoding performance.

Figure 1:
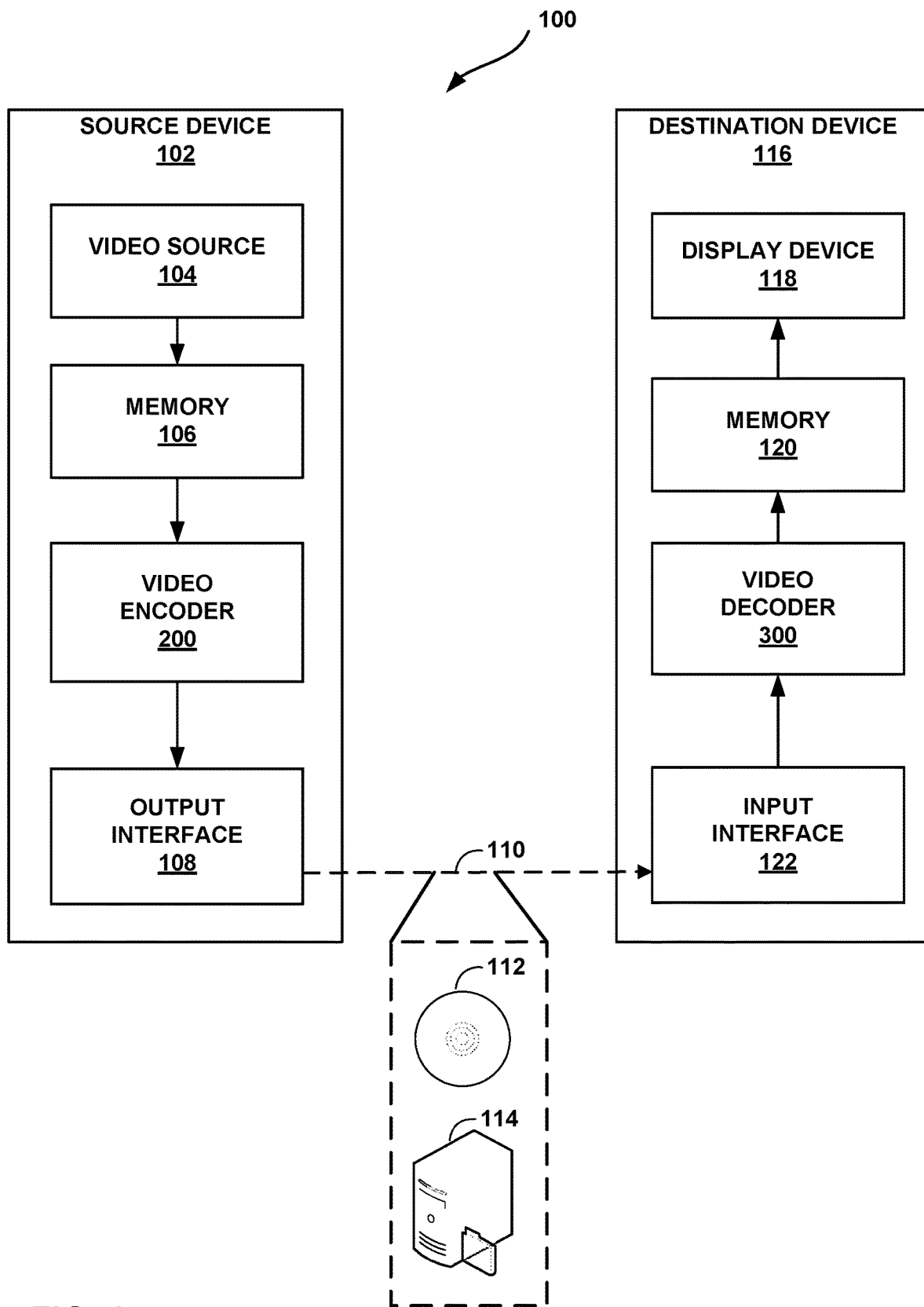
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for sub-picture extraction, sub-picture reference picture list (RPL) constraints, and sub-picture reordering constraints. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for sub-picture extraction, sub-picture RPL constraints and sub-picture reordering constraints. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may demodulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). A recent draft of the VVC standard is described in Bross, et al. "Versatile Video Coding (Draft 9)," Joint Video Experts Team (JVET) of ITU-T SG 16 WP 3 and ISO/IEC JTC 1/SC 29/WG 11, 18$^{th}$ Meeting: by teleconference, 15-24 Apr. 2020, JVET-R2001-v8 (hereinafter "VVC Draft 9"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

Some example devices, such as video encoder 200 and video decoder 300, and draft video coding standards may support the use of virtual boundaries for pictures and may support the treating (e.g., processing or coding such as encoding or decoding) of a sub-picture as a picture. When a sub-picture is treated (e.g., processed or coded such as encoded or decoded) as a picture, a video decoder may extract the sub-picture and decode the sub-picture independently from another sub-picture within a same picture. When a video decoder extracts a sub-picture from a picture having virtual boundaries, the virtual boundaries may be outside of the sub-picture. This may cause decoding errors which may negatively affect the quality of the decoded video.

In accordance with the techniques of this disclosure, a method includes extracting a current sub-picture from a bitstream of the video data, parsing virtual boundary syntax elements indicative of virtual boundaries for a current picture, the current sub-picture being associated with the current picture, updating the virtual boundaries based at least in part on the virtual boundary syntax elements, and decoding the current sub-picture based on the updated virtual boundaries.

In accordance with the techniques of this disclosure, a device includes memory configured to store the video data, and one or more processors implemented in circuitry and communicatively coupled to the memory, the one or more processors being configured to: extract a current sub-picture from a bitstream of the video data; parse virtual boundary syntax elements indicative of virtual boundaries for a current picture, wherein the current sub-picture is associated with the current picture; update the virtual boundaries based at least in part on the virtual boundary syntax elements; and decode the current sub-picture based on the updated virtual boundaries.

In accordance with the techniques of this disclosure, a non-transitory computer-readable storage medium is encoded with instructions that, when executed, cause one or more processors to extract a current sub-picture from a bitstream of the video data, parse virtual boundary syntax elements indicative of virtual boundaries for a current picture, wherein the current sub-picture is associated with the current picture, update the virtual boundaries based at least in part on the virtual boundary syntax elements, and decode the current sub-picture based on the updated virtual boundaries.

In accordance with the techniques of this disclosure, a device includes means for extracting a current sub-picture from a bitstream of the video data, means for parsing virtual boundary syntax elements indicative of virtual boundaries for a current picture, wherein the current sub-picture is associated with the current picture, means for updating the virtual boundaries based at least in part on the virtual boundary syntax elements, and means for decoding the current sub-picture based on the updated virtual boundaries.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2:
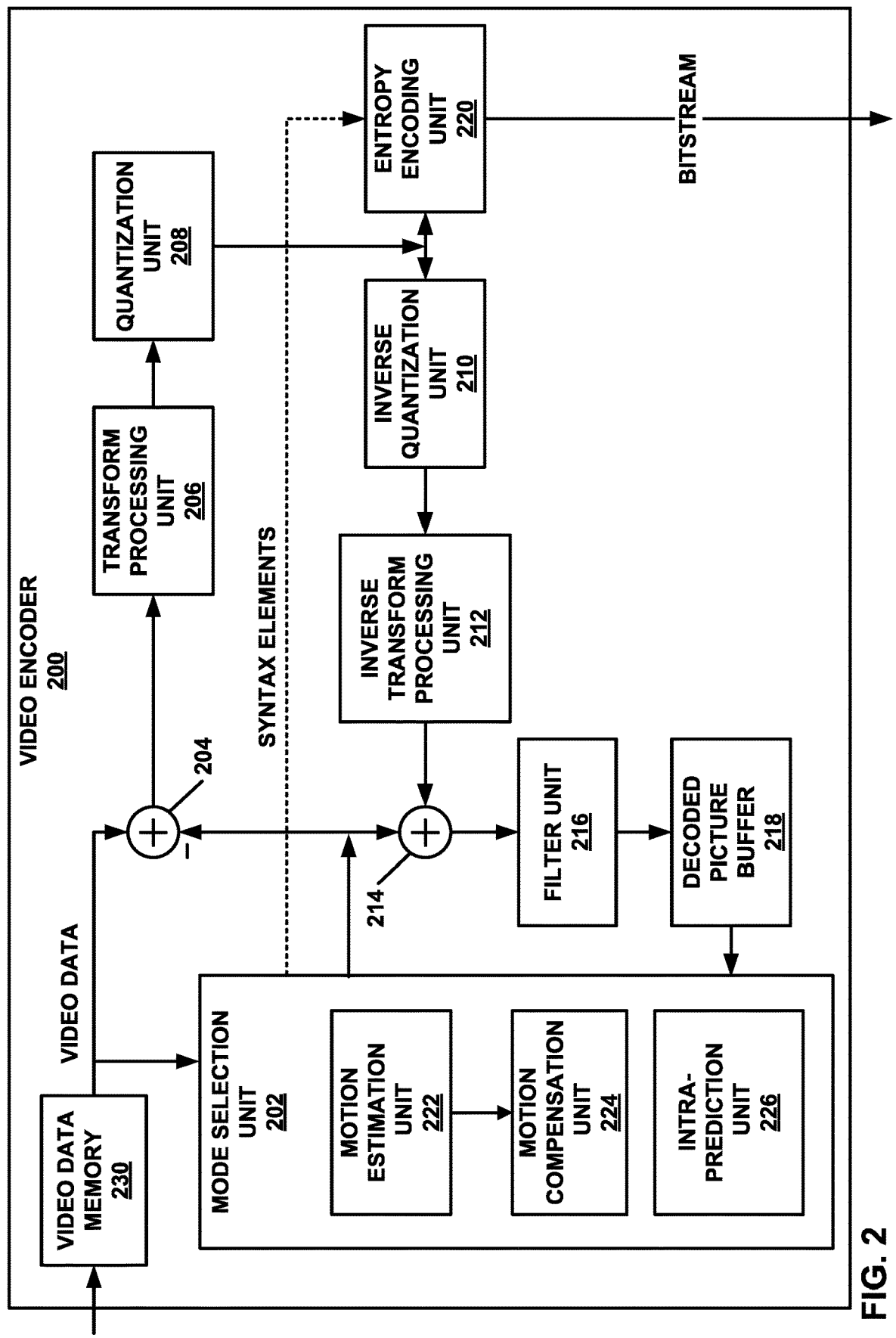
FIG. 2 is a block diagram illustrating an example video encoder that may perform the techniques of this disclosure.

FIG. 2 is a block diagram illustrating an example video encoder 200 that may perform the techniques of this disclosure. FIG. 2 is provided for purposes of explanation and should not be considered limiting of the techniques as broadly exemplified and described in this disclosure. For purposes of explanation, this disclosure describes video encoder 200 according to the techniques of VVC (ITU-T H.266, under development), and HEVC (ITU-T H.265). However, the techniques of this disclosure may be performed by video encoding devices that are configured to other video coding standards.

In the example of FIG. 2, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, of FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 2 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as a few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying an MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Figure 3:
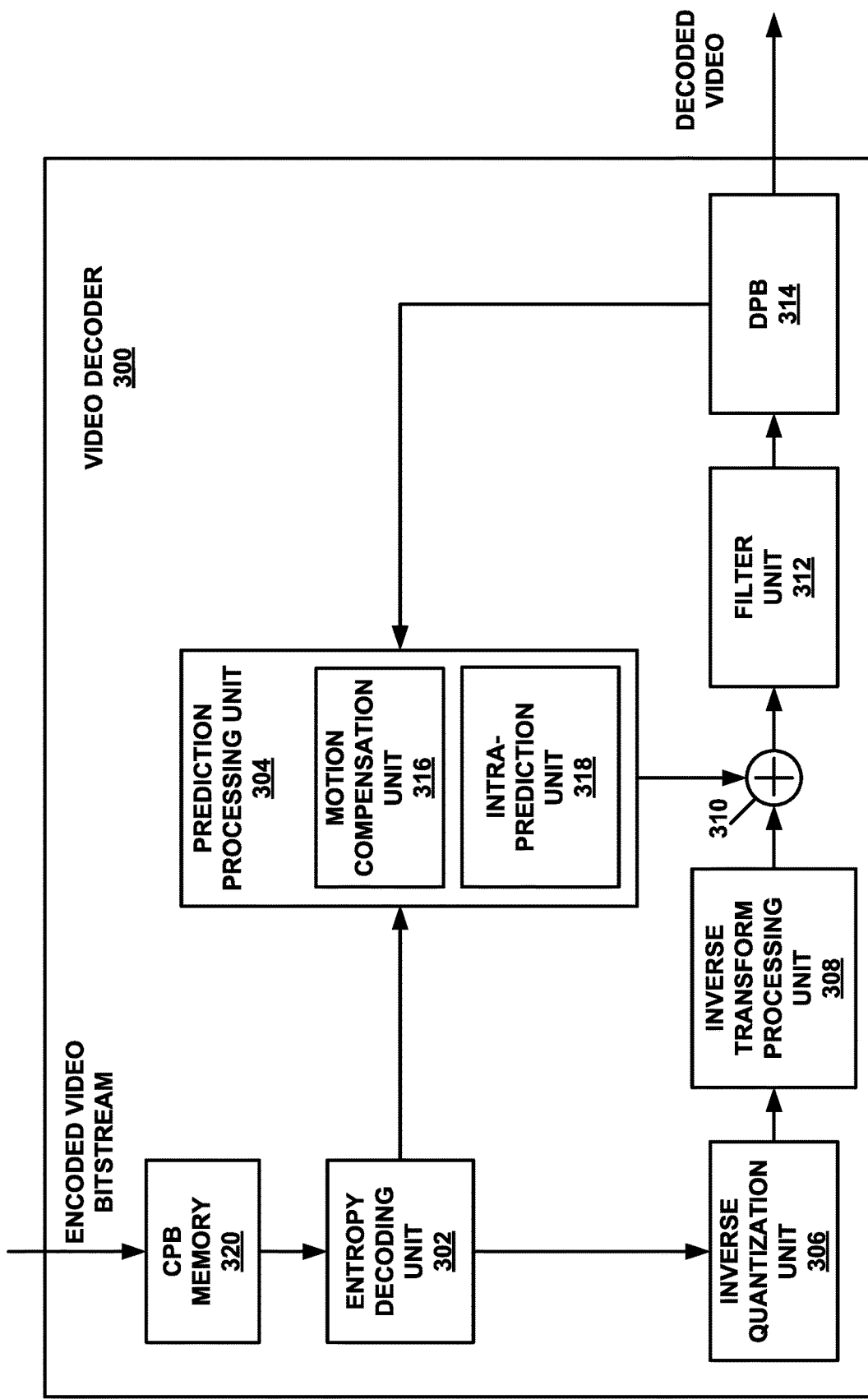
FIG. 3 is a block diagram illustrating an example video decoder that may perform the techniques of this disclosure.

FIG. 3 is a block diagram illustrating an example video decoder 300 that may perform the techniques of this disclosure. FIG. 3 is provided for purposes of explanation and is not limiting on the techniques as broadly exemplified and described in this disclosure. For purposes of explanation, this disclosure describes video decoder 300 according to the techniques of VVC (ITU-T H.266, under development), and HEVC (ITU-T H.265). However, the techniques of this disclosure may be performed by video coding devices that are configured to other video coding standards.

In the example of FIG. 3, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, of FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 3 are illustrated to assist with understanding the operations performed by video decoder 300. The units may be implemented as fixed-function circuits, programmable circuits, or a combination thereof. Similar to FIG. 2, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients. In some examples, entropy decoding unit 302 may extract a current sub-picture from a bitstream of the video data and parse virtual boundary syntax elements indicative of virtual boundaries of a picture.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 2).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 2). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block. In some examples, reconstruction unit 310 may decode the current sub-picture based on the updated virtual boundaries.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processors implemented in circuitry and communicatively coupled to the memory, the one or more processors being configured to: extract a current sub-picture from a bitstream of the video data, parse virtual boundary syntax elements indicative of virtual boundaries for a current picture, wherein the current sub-picture is associated with the current picture; update the virtual boundaries based at least in part on the virtual boundary syntax elements; and decode the current sub-picture based on the updated virtual boundaries.

Figure 4:
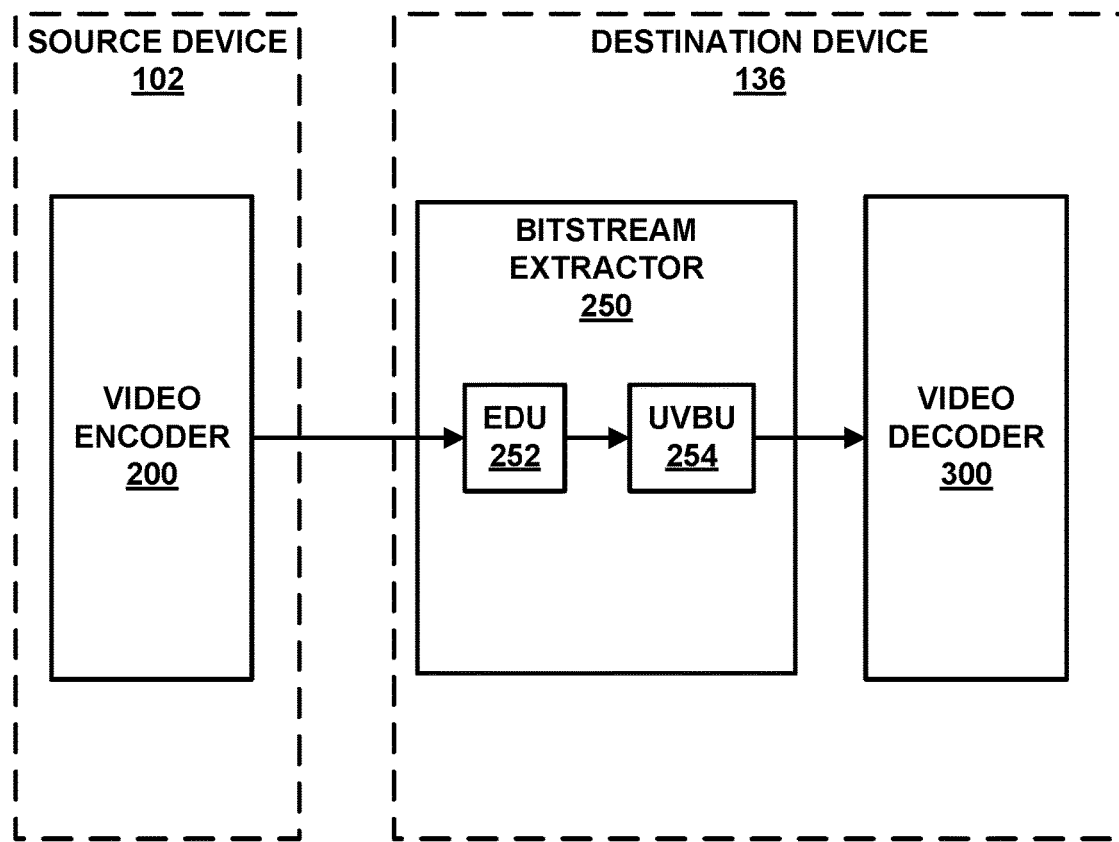
FIG. 4 is a block diagram illustrating another example video encoding and decoding system that may perform the techniques of this disclosure.

FIG. 4 is a block diagram illustrating another example video encoding and decoding system that may perform the techniques of this disclosure. The example of FIG. 4 includes source device 102 which includes video encoder 200 and destination device 136 which includes bitstream extractor 250 and video decoder 300. Bitstream extractor 250 may be configured to extract a current sub-picture from a bitstream of the video data. In some examples, bitstream extractor 250 may be configured to parse virtual boundary syntax elements indicative of virtual boundaries for a current picture, the current sub-picture being associated with the current picture. For example, bitstream extractor 250 may include an entropy decoding unit 252 (shown as EDU 252), similar to entropy decoding unit 302 of video decoder 300, which may parse the virtual boundary syntax elements. Update virtual boundaries unit 254 (shown as UVBU 254) may update the virtual boundaries based at least in part on the virtual boundary syntax elements. Video decoder 300 may decode the current sub-picture based on the updated virtual boundaries.

In some examples, one or more of the techniques attributed to bitstream extractor 250 may be performed by video decoder 300. In some examples, bitstream extractor may not be part of destination device 136, but instead may be part of a server. In some examples, bitstream extractor 250 may be implemented as an application which may run on destination device 116, destination device 136, or the server, for example.

In this manner, bitstream extractor 250 represents an example of a bitstream extractor device including a memory configured to store video data, and one or more processors implemented in circuitry and communicatively coupled to the memory, the one or more processors being configured to: extract a current sub-picture from a bitstream of the video data, parse virtual boundary syntax elements indicative of virtual boundaries for a current picture, the current sub-picture being associated with the current picture; and update the virtual boundaries based at least in part on the virtual boundary syntax elements.

As discussed above, some draft video coding standards, such as VVC Draft 9, may support the use of virtual boundaries for pictures and may support the treating of a sub-picture as a picture. When a sub-picture is treated as a picture, a video decoder may extract the sub-picture and decode the sub-picture independently from another sub-picture within a same picture. When a video decoder extracts a sub-picture from a picture having virtual boundaries, the virtual boundaries may be outside of the sub-picture. This may cause decoding errors which may negatively affect the quality of the decoded video.

A sub-picture is a feature of some video coding standards, such as VVC Draft 9. A sub-picture may be specified to be independently extractable and decodable. Sub-pictures may be useful in viewport-dependent 360 degree video or in region of interest applications. For example, when a person moves their head when viewing a viewport-dependent 360 degree video, the view may shift such that a new sub-picture may be extracted and decoded to be displayed in the viewport with other pictures and/or sub-pictures.

Virtual boundaries may be used for adaptive loop filtering operations. When an adaptive loop filter is centered on a sample to be filtered and a portion of the filter extends over a virtual boundary, the filter may be changed such that samples on another side of the virtual boundary than the current to-be-filtered sample are not used. Therefore, if a virtual boundary is located outside of a current sub-picture (e.g., not inside the current sub-picture or at the real boundary of the current sub-picture), when applying adaptive loop filtering, samples to be included in the filter template may be in other sub-pictures or pictures which may not be available for the filtering operations. For example, another sub-picture, which may contain the virtual boundary, may not have been decoded, so the samples of the other sub-picture may not be available for the filtering operation. Therefore, it may be desirable to move the virtual boundaries for an extracted sub-picture.

Additionally, some draft video coding standards, such as VVC Draft 9, contain reference picture list constraints. These reference picture list constraints may not accommodate a use case where a picture with multiple sub-pictures is predicted from an inter-layer reference picture with only one sub-picture.

Furthermore, some draft video coding standards, such as VVC Draft 9, do not require a sub-picture to be treated as a picture when sub-picture reordering occurs. This may cause a decoding mismatch which may negatively affect the quality of the decoded video.

VVC has been developed by JVET of ITU-T and ISO/IEC to achieve substantial compression capability beyond HEVC for a broadened range of applications. VVC Draft 9 specifies normative bitstream and picture formats, high level syntax (HLS) and semantics, and the parsing and decoding process. VVC Draft 9 also specifies profiles/tiers/levels (PTL) restrictions, byte stream format, a hypothetical reference decoder and supplemental enhancement information (SEI) in an annex.

VVC Draft 9 inherits a number of high-level features from HEVC, such as NAL unit and parameter set concepts, tile and wave-front parallel processing, layered coding and the use of SEI messages for supplemental data signaling. Additional high-level features were introduced in VVC Draft 9, including rectangular slice and sub-picture concepts, picture resolution adaptation, mixed NAL unit types, picture headers (PH), gradual decoding refresh (GDR) pictures, virtual boundaries, and the reference picture list (RPL) for reference picture management.

Numerous signaling conditions or semantic constraints are specified in VVC Draft 9 on the parameter set syntax elements, and the variables video decoder 300 may derive from the syntax elements are used by video decoder 300 in the decoding process.

The following describes one or more issues that may be present in VVC Draft 9. A number of sub-picture related issues are identified in VVC Draft 9 as follows: 1) The rewriting process on sub-picture ID mapping and sub-picture-based virtual boundaries is missing in VVC Draft 9 sub-picture sub-bitstream extraction process; 2) The sub-picture-based RPL constraint should be updated to accommodate the use case of when a picture with multiple sub-pictures is predicted from an inter-layer reference picture with only one sub-picture; and 3) The sub-picture is not required to be treated as a picture when sub-picture reordering occurs, which may cause a decoding mismatch. A constraint may be required to avoid such a mismatch.

Sub-picture sub-bitstream extraction is now discussed. VVC Draft 9 specifies the re-writing process for sub-picture sub-bitstream extraction when there is no external means for a video coder, such as video encoder 200 or video decoder 300, to provide replacement parameter sets, including general_level_idc, picture width and height, sps_num_subpics_minus1 and pps_num_subpics_minus1, sub-picture position, tile/slice layout and conformance window.

There may be only one sub-picture per layer after the sub-picture extraction process. The sub-picture ID mapping to the 0-th sub-picture in inBitstream may not be equal to the sub-picture ID of the extracted sub-picture. As a result, sub-picture ID mapping rewriting may be necessary to identify the extracted sub-bitstream slice NAL units in outBitstream. In addition, the sub-picture virtual boundary positions signaled in inBitstream by video encoder 200 may not be aligned with the new picture width and height, and some virtual boundary positions may be outside the new picture boundaries. Therefore, it may be necessary to rewrite the SPS virtual boundary information when the information is present.

To address this issue, video encoder 200, bitstream extractor 250, or video decoder 300 may follow the additional techniques specified as follows:

1) Remove the subpicture ID syntax elements in the SPS and the PPS (e.g., sps_subpic_id[j] and pps_subpic_id[j]) in all the referenced SPS and PPS NAL units and for each j that is not equal to subpicIdx. In other words, for each j that is not equal to subpicIdx, when video decoder 300 rewrites or updates the SPS or the PPS, sps_subpic_id[j] or pps_subpic_id[j], respectively, are not present in the SPS or the PPS. For example, video decoder 300 may rewrite a PPS associated with a current sub-picture, wherein the rewritten PPS does not include PPS sub-picture identifiers for sub-pictures other than the current sub-picture. Similarly, video decoder 300 may rewrite an SPS associated with the current sub-picture, wherein the rewritten SPS does not include SPS sub-picture identifiers for sub-pictures other than the current sub-picture.

2) The variables numVerVBs, subpicVBx, numHorVBs and subpicVBy are derived as follows:

```
numVerVBs = 0;
for( i = 0; i < sps_num_ver_virtual_boundaries; i++) {
   if( sps_virtual_boundary_pos_x[ i ] >
(sps_subpic_ctu_top_left_x[ subpicIdx ] * CtbSizeY / 8)
      && sps_virtual_boundary_pos_x[ i ] <
min( ( sps_subpic_ctu_top_left_x[ subpicIdx ] + sps_subpic_width_minus1[ subpicIdx
] + 1 ) * CtbSizeY, pps_pic_width_in_luma_samples ) / 8 )
      subpicVBx[ numVerVBs ++ ] = sps_virtual_boundary_pos_x[ i ]
- sps_subpic_ctu_top_left_x[ subpicIdx ] * CtbSizeY / 8
   numHorVBs = 0;
   for( i = 0; i < sps_num_hor_virtual_boundaries; i++) {
      if( sps_virtual_boundary_pos_y[ i ] >
```

```
(sps_subpic_ctu_top_left_y[ subpicIdx ] * CtbSizeY / 8)
    && sps_virtual_boundary_pos_y[ i ] <
min( ( sps_subpic_ctu_top_left_y[ subpicIdx ] + sps_subpic_height_minus1[ subpicIdx
] + 1 ) * CtbSizeY, pps_pic_height_in_luma_samples ) / 8 )
    subpicVBy[ numHorVBs ++ ] = sps_virtual_boundary_pos_y[ i ] -
sps_subpic_ctu_top_left_y[ subpicIdx ] * CtbSizeY / 8
```

When sps_virtual_boundaries_present_flag is equal to 1, rewrite the values of the sps_num_ver_virtual_boundaries, sps_virtual_boundary_pos_x[ ], sps_num_hor_virtual_boundaries, and sps_virtual_boundary_pos_y[ ] in all the reference SPS NAL units to be equal to numVerVBs, subpicVBx[i], numHorVBs and subpicVBy[j] and i is in the range of 0 to numVerVBs, exclusive, and j is in the range of 0 to numHorVBs, exclusive. The virtual boundaries outside the extracted sub-picture are removed. When both numVerVBs and numHorVBs are equal to 0, rewrite the value of sps_virtual_boundaries_present_flag in all the referenced SPS NAL units to 0 and remove the syntax elements sps_num_ver_virtual_boundaries, sps_virtual_boundary_pos_x[i], sps_num_hor_virtual_boundaries, and sps_virtual_boundary_pos_y[i].

For example, bitstream extractor 250 or video decoder 300 may extract a current sub-picture from a bitstream of the video data. Bitstream extractor 250 or video decoder 300 may parse virtual boundary syntax elements indicative of virtual boundaries for a current picture, the current sub-picture being associated with the current picture. For example, bitstream extractor 250 or video decoder 300 may parse sps_num_ver_virtual_boundaries, sps_virtual_boundary_pos_x[i], sps_num_hor_virtual_boundaries, and sps_virtual_boundary_pos_y[i]. Bitstream extractor 250 or video decoder 300 may update the virtual boundaries (e.g., for the current sub-picture) based at least in part on the virtual boundary syntax elements. For example, bitstream extractor 250 or video decoder 300 may rewrite sps_num_ver_virtual_boundaries, sps_virtual_boundary_pos_x[ ], sps_num_hor_virtual_boundaries, and sps_virtual_boundary_pos_y[ ] to be equal to numVerVBs, subpicVBx[i], numHorVBs and subpicVBy[j], respectively, as described above. Video decoder 300 may decode the current sub-picture based on the updated virtual boundaries.

A sub-picture RPL constraint is now discussed. In VVC Draft 9, when a current picture is not an independent layer and has multiple sub-pictures, each sub-picture can be either predicted from the collocated sub-picture with the same sub-picture ID of a reference picture with the same sub-picture layout, or predicted from an inter-layer reference picture with only one sub-picture as specified below:

When vps_independent_layer_flag[GeneralLayerIdx [nuh_layer_id] ] is equal to 0 and sps_num_subpics_minus1 is greater than 0, either of the following two conditions (but not both) may be (e.g., shall be) true: 1) The picture referred to by each active entry in RefPicList[0] or RefPicList[1] has the same sub-picture layout as the current picture (e.g., the SPSs referred to by that picture and the current picture have the same value of sps_num_subpics_minus1 and the same values of sps_subpic_ctu_top_left_x[j], sps_subpic_ctu_top_left_y[j], sps_subpic_width_minus1[j], and sps_subpic_height_minus1[j], respectively, for each value of j in the range of 0 to sps_num_subpics_minus1, inclusive); or 2) The picture referred to by each active entry in RefPicList[0] or RefPicList[1] is an inter-layer reference picture (ILRP) for which the value of sps_num_subpics_minus1 is equal to 0.

Additionally, there is an RPL constraint to restrict the active entries for sub-pictures as follows. "It is a requirement of bitstream conformance that both of the following constraints apply:

For any two different values of i and j in the range of 0 to sps_num_subpics_minus1, inclusive, SubpicIdVal[i] shall not be equal to SubpicIdVal[j].

For each value of i in the range of 0 to sps_num_subpics_minus1, inclusive, when the value of SubpicIdVal[i] of a current picture is not equal to the value of SubpicIdVal[i] of a reference picture, the active entries of the RPLs of the coded slices in the i-th sub-picture of the current picture shall not include that reference picture."

A reference layer with only one sub-picture should be excluded from the above constraint, as the whole picture is used for reference. For example, video encoder 200, bitstream extractor 250, or video decoder 300 may exclude the above constraint for a reference layer with only one sub-picture. For example, video encoder 200, bitstream extractor 250, or video decoder 300 may determine that a reference layer has more than one sub-picture, wherein the rewriting the PPS and/or the SPS is at least partially based on the reference layer having more than one sub-picture. For example, video decoder 300 may determine that a reference picture for the current picture is an inter-layer reference picture having only one sub-picture, wherein a sub-picture identifier of a collocated sub-picture in the reference picture and the sub-picture identifier of the current sub-picture have different values.

The RPL constraint may be updated as follows, with changes from VVC Draft 9 shown between <CHANGE> and </CHANGE>:

For each value of i in the range of 0 to sps_num_subpics_minus1, inclusive, if <CHANGE> reference picture has more than one sub-picture and </CHANGE> the value of SubpicIdVal[i] of a current picture is not equal to the value of SubpicIdVal[i] of a reference picture, the active entries of the RPL of the coded slices in the i-th sub-picture of the current picture shall not include that reference picture.

For example, bitstream extractor 250 or video decoder 300 may determine whether a reference picture for the current picture has more than one sub-picture and based at least in part on the reference picture not having more than one sub-picture, add the reference picture as an active entry in a reference picture list for the current sub-picture. In this manner, bitstream extractor 250 or video decoder 300 may refrain from applying the constraint when the reference picture has only one sub-picture.

To enable a case when a current layer and a reference layer both have just one sub-picture but the sub-picture IDs are different, this disclosure describes examples to apply this constraint only when a current layer picture has more than 1 sub-picture. For example, video encoder 200, bitstream extractor, or video decoder 300 may only apply the constraint when the current layer picture has more than one sub-picture.

<CHANGE> If there is more than one sub-picture in the current picture then </CHANGE> for each value of i in the range of 0 to sps_num_subpics_minus1, inclusive, if <CHANGE> reference picture has more than one sub-picture and </CHANGE> the value of SubpicIdVal[i] is not equal to the value of SubpicIdVal[i] of a reference picture, the active entries of the RPL of the coded slices in the i-th sub-picture of the current picture shall not include that reference picture.

For example, video decoder 300 may determine whether a reference picture for the current picture has more than one sub-picture and whether the current picture has more than one sub-picture. Based at least in part on the reference picture not having more than one sub-picture, or the current picture not having more than one sub-picture, or the reference picture and the current picture both not having more than one sub-picture, video decoder 300 may add the reference picture as an active entry in a reference picture list for the current sub-picture. In this manner, video decoder 300 may refrain from applying the constraint when the reference picture, the current picture, or both the reference picture and the current picture have only one sub-picture.

In another example, the RPL constraint may be expressed for the pictures within the same layer as follows: For each value of i in the range of 0 to sps_num_subpics_minus1, inclusive, when the value of SubpicIdVal[i] of a current picture is not equal to the value of SubpicIdVal[i] of a reference picture <CHANGE> in the same layer </CHANGE>, the active entries of the RPLs of the coded slices in the i-th sub-picture of the current picture shall not include that reference picture.

In some examples, any or all aforementioned constraints may apply only to the cases when a sub-picture of the current picture is treated as picture, for example when associated sps_subpic_treated_as_pic_flag[i] is equal to 1. For example, video encoder 200, bitstream extractor 250, or video decoder 300 may determine that the current sub-picture is to be processed as a picture, wherein the rewriting the PPS and/or the SPS is at least partially based on the current sub-picture being processed as the picture. In some examples, video encoder 200, bitstream extractor 250, or video decoder 300 may determine that the current sub-picture is to be processed as a picture, and determine that a reference layer has more than one sub-picture, wherein the rewriting the PPS and/or the SPS is based on the current sub-picture being processed as the picture and the reference layer having more than one sub-picture. For example, video decoder 300 may determine that the current picture has more than one sub-picture and determine that the current sub-picture is to be processed as a picture, wherein a sub-picture identifier of a collocated sub-picture in a reference picture for the current picture and the sub-picture identifier of the current sub-picture have a same value. For example, video decoder 300 may determine that the current picture has more than one sub-picture and determine that the current sub-picture is not to be processed as a picture, wherein a sub-picture identifier of a collocated sub-picture in a reference picture for the current picture and the sub-picture identifier of the current sub-picture have different values.

In one example for one of the above constraints, the constraint can be expressed as follows: For each value of i in the range of 0 to sps_num_subpics_minus1, inclusive, when <CHANGE> sps_subpic_treated_as_pic_flag[i] is equal to 1 and </CHANGE> the value of SubpicIdVal[i] of a current picture is not equal to the value of SubpicIdVal[i] of a reference picture <CHANGE> in the same layer </CHANGE>, the active entries of the RPLs of the coded slices in the i-th sub-picture of the current picture shall not include that reference picture.

For example, video decoder 300 may determine whether the current sub-picture is to be processed as a picture and based at least in part on the current sub-picture not being processed as the picture, add a reference picture as an active entry in a reference picture list for the current sub-picture. In this manner, video decoder 300 may refrain from applying the constraint when the current sub-picture is not processed as a picture.

A sub-picture reordering constraint is now discussed. VVC Draft 9 allows sub-picture reordering when a sub-picture is not treated as a picture, e.g., sps_subpic_treated_as_pic_flag[i] is equal to 0. Sub-picture reordering may mean that the collocated sub-picture ID in a reference picture is different from the current sub-picture ID. If such referencing is allowed, the referencing may create a mismatch in the reconstruction, when sub-pictures are reordered, e.g., by video decoder 300.

In one example, a constraint is added that if a sub-picture is reordered, for example, a collocated sub-picture in a reference picture has a different ID, then the current sub-picture shall be treated as a picture, e.g., sps_subpic_treated_as_pic_flag[i] is equal to 1. For example, video encoder 200 or video decoder 300 may treat the current sub-picture as a picture if the current sub-picture is reordered.

For example, video decoder 300 may determine whether the current sub-picture is reordered, and based at least in part on the current sub-picture being reordered, treat the current sub-picture as a picture.

In one example, this constraint can be expressed as follows: For each value of i in the range of 0 to sps_num_subpics_minus1, inclusive, when the value of SubpicIdVal[i] of a current picture is not equal to the value of SubpicIdVal[i] of a reference picture in the same layer sps_subpic_treated_as_pic_flag[i] shall be equal to 1.

In another example, a constraint may require all sub-pictures of a picture be treated as a picture if there is at least one reordered sub-picture in the picture. For example, video encoder 200 or video decoder 300 may treat all sub-pictures of a current picture as pictures if at least one sub-picture of the current picture is reordered.

For example, when the current picture includes more than one sub-picture, video decoder 300 may, based at least in part on the current sub-picture being reordered, treat all sub-pictures of the current picture as pictures.

In one example, this constraint can be expressed as follows: For any value of i in the range of 0 to sps_num_subpics_minus1, inclusive, when the value of SubpicIdVal[i] of a current picture is not equal to the value of SubpicIdVal[i] of a reference picture in the same layer sps_subpic_treated_as_pic_flag[j] shall be equal to 1 for each value of j in the range of 0 to sps_num_subpics_minus1, inclusive.

Additionally, in some examples, the above constraints may be applied only for P- or B-slices in a sub-picture. For example, video decoder 300 may determine whether a slice in the current sub-picture is a P slice or a B slice and further based on the slice being a P slice or a B slice and the current sub-picture being reordered, treat the current sub-picture as the picture.

Figure 5:
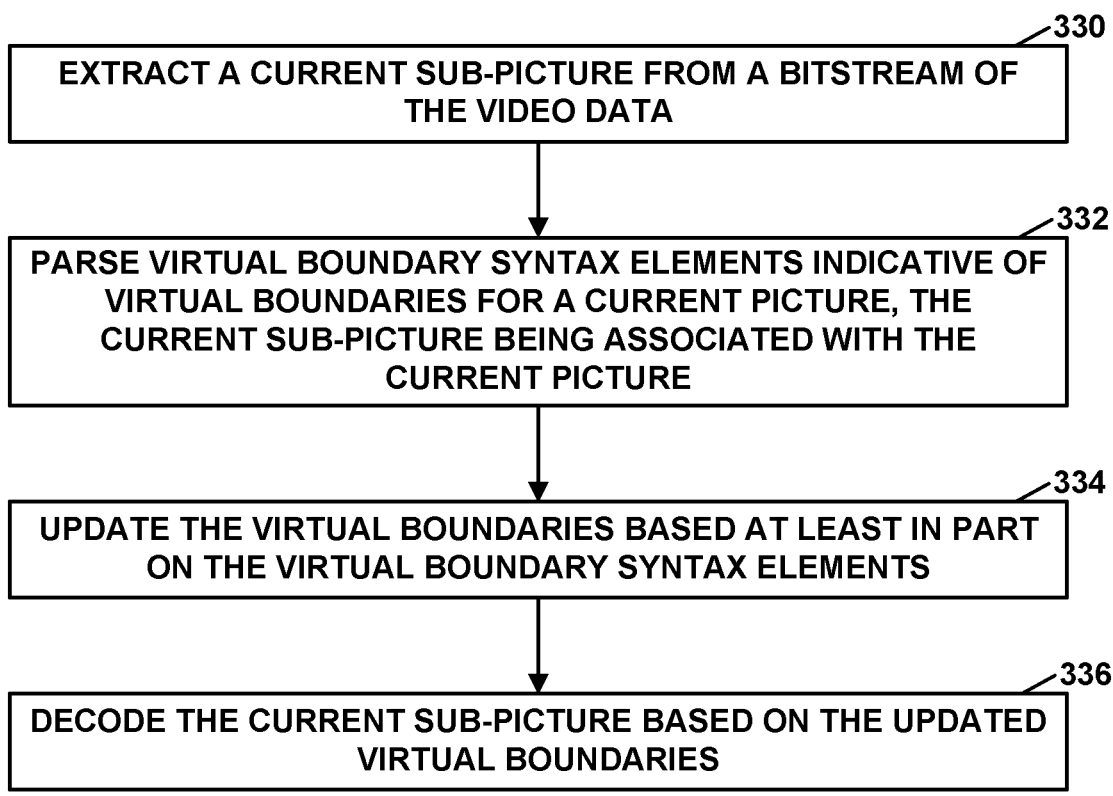
FIG. 5 is a flowchart illustrating example sub-picture extraction techniques of this disclosure.

FIG. 5 is a flowchart illustrating example sub-picture extraction techniques of this disclosure. Video decoder 300 or bitstream extractor 250 may extract a current sub-picture from a bitstream of the video data (330). For example, video decoder 300 may begin decoding a current sub-picture or bitstream extractor 250 extract the current sub-picture from the bitstream.

Video decoder 300 or bitstream extractor 250 may parse virtual boundary syntax elements indicative of virtual boundaries for a current picture, the current sub-picture being associated with the current picture (332). For example, video decoder 300 or bitstream extractor 250 may parse sps_num_ver_virtual_boundaries, sps_virtual_boundary_pos_x[i], sps_num_hor_virtual_boundaries, and sps_virtual_boundary_pos_y[i].

Video decoder 300 or bitstream extractor 250 may update the virtual boundaries (e.g., for the current sub-picture) based at least in part on the virtual boundary syntax elements (334). For example, video decoder 300 or bitstream extractor 250 may rewrite the values of sps_num_ver_virtual_boundaries, sps_virtual_boundary_pos_x[i], sps_num_hor_virtual_boundaries, and sps_virtual_boundary_pos_y[i] to be equal to numVerVBs, subpicVBx[i], numHorVBs and subpicVBy[j], respectively, as discussed above. This may remove the virtual boundaries outside the extracted current sub-picture.

Video decoder 300 may decode the current sub-picture based on the updated virtual boundaries (336). For example, video decoder 300 may use the updated virtual boundaries when decoding the current sub-picture.

In some examples, bitstream extractor 250 or video decoder 300 may rewrite a PPS associated with the current sub-picture, wherein the rewritten PPS does not include PPS sub-picture identifiers for sub-pictures other than the current sub-picture. For example, bitstream extractor 250 or video decoder 300 may remove a PPS sub-picture identifier for other sub-pictures, such as pps_subpic_id[j], from the PPS, for each j that is not equal to subpicIdx.

In some examples, bitstream extractor 250 or video decoder 300 may determine that the current sub-picture is to be processed as a picture and determine that a reference layer has more than one sub-picture, wherein the rewriting the PPS is based on the current sub-picture being processed as the picture and the reference layer having more than one sub-picture.

In some examples, bitstream extractor 250 or video decoder 300 may rewrite an SPS associated with the current sub-picture, wherein the rewritten SPS does not include SPS sub-picture identifiers for sub-pictures other than the current sub-picture. For example, bitstream extractor 250 or video decoder 300 may remove an SPS sub-picture identifier for other sub-pictures, such as sps_subpic_id[j], from the SPS, for each j that is not equal to subpicIdx.

In some examples, bitstream extractor 250 or video decoder 300 may determine that the current sub-picture is to be processed as a picture; and determine that a reference layer has more than one sub-picture, wherein the rewriting the SPS is based on the current sub-picture being processed as the picture and the reference layer having more than one sub-picture.

In some examples, bitstream extractor 250 or video decoder 300 may determine that a reference picture for the current picture does not have more than one sub-picture and, based at least in part on the reference picture not having more than one sub-picture, add the reference picture as an active entry in a reference picture list for the current sub-picture. In such a case, video decoder 300 may decode the current sub-picture based on the updated virtual boundaries and the reference picture list. For example, video decoder 300 may refrain from applying a constraint that the reference picture may not be an active entry in the reference picture list for the current sub-picture, unless there are more than one sub-picture in the reference picture. In some examples, the reference picture and the current picture are in a same layer.

In some examples, video decoder 300 may determine whether a reference picture for the current picture has more than one sub-picture and determine whether the current picture has more than one sub-picture. Based at least in part on the reference picture not having more than one sub-picture, the current picture not having more than one sub-picture, or the reference picture and the current picture both not having more than one sub-picture, video decoder 300 may add the reference picture as an active entry in a reference picture list for the current sub-picture. In such a case, video decoder 300 may decode the current sub-picture based on the updated virtual boundaries and the reference picture list. For example, video decoder 300 may refrain from applying a constraint that the reference picture may not be an active entry in the reference picture list for the current sub-picture, unless there are more than one sub-picture in the reference picture, more than one sub-picture in the current picture, or more than one sub-picture in both the reference picture and the current picture.

In some examples, video decoder 300 may determine whether the current sub-picture is processed as a picture and, based at least in part on the current sub-picture not being processed as a picture, add the reference picture as an active entry in a reference picture list for the current sub-picture. In such a case, video decoder 300 may decode the current sub-picture based on the updated virtual boundaries and the reference picture list. For example, video decoder 300 may parse sps_subpic_treated_as_pic_flag[i] to determine whether the current sub-picture is treated as a picture. For example, video decoder 300 may refrain from applying a constraint that the reference picture may not be an active entry in the reference picture list for the current sub-picture, unless the current sub-picture is treated as a picture. In some examples, the reference picture and the current picture are in a same layer.

In some examples, video decoder 300 may determine whether the current sub-picture is reordered. In some examples, as part of determining whether the current sub-picture is reordered, video decoder 300 may determining whether a collocated sub-picture in a reference picture has a same identifier as the current sub-picture. Based at least in part on the current sub-picture being reordered, video decoder 300 may process the current sub-picture as a picture.

In some examples, the picture includes more than one sub-picture, and video decoder 300, based at least in part on the current sub-picture being reordered, may process all sub-pictures of the current picture as pictures.

In some examples, video decoder 300 may determine whether a slice in the current sub-picture is a P slice or a B slice, and, further based on the slice being a P slice or a B slice and the sub-picture being reordered, process the current sub-picture as the picture.

In some examples, video decoder 300 may determine that the current picture has more than one sub-picture and determine that the current sub-picture is to be processed as a picture, wherein a sub-picture identifier of a collocated sub-picture in a reference picture for the current picture and the sub-picture identifier of the current sub-picture have a same value. In some examples, video decoder 300 may determine that a reference picture for the current picture is an inter-layer reference picture having only one sub-picture, wherein a sub-picture identifier of a collocated sub-picture in the reference picture and the sub-picture identifier of the current sub-picture have different values. In some examples, video decoder 300 may determine that the current picture has more than one sub-picture and determine that the current sub-picture is not to be processed as a picture, wherein a sub-picture identifier of a collocated sub-picture in a reference picture for the current picture and the sub-picture identifier of the current sub-picture have different values.

Figure 6:
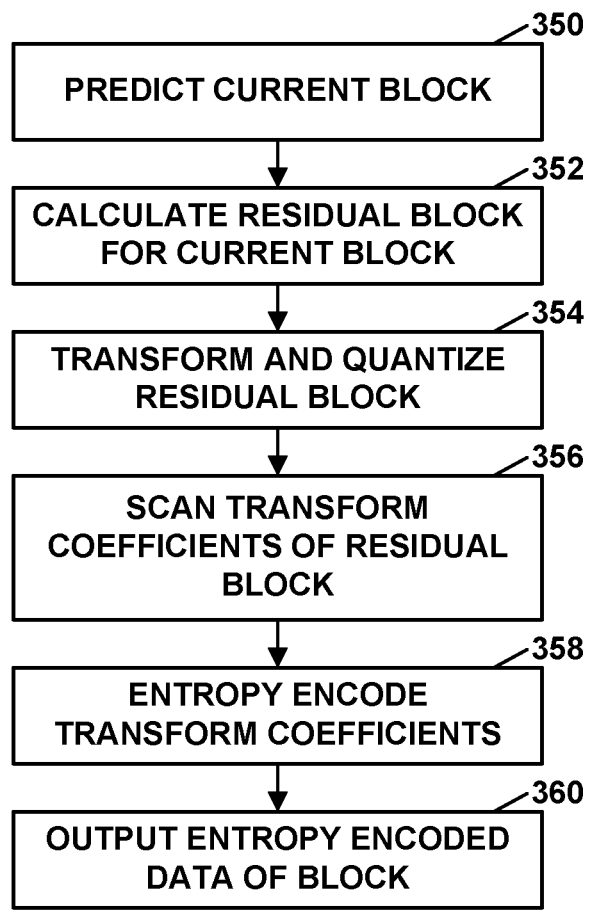
FIG. 6 is a flowchart illustrating an example of video encoding.

FIG. 6 is a flowchart illustrating an example method for encoding a current block. The current block may comprise a current CU. Although described with respect to video encoder 200 (FIGS. 1 and 2), it should be understood that other devices may be configured to perform a method similar to that of FIG. 6.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 7:
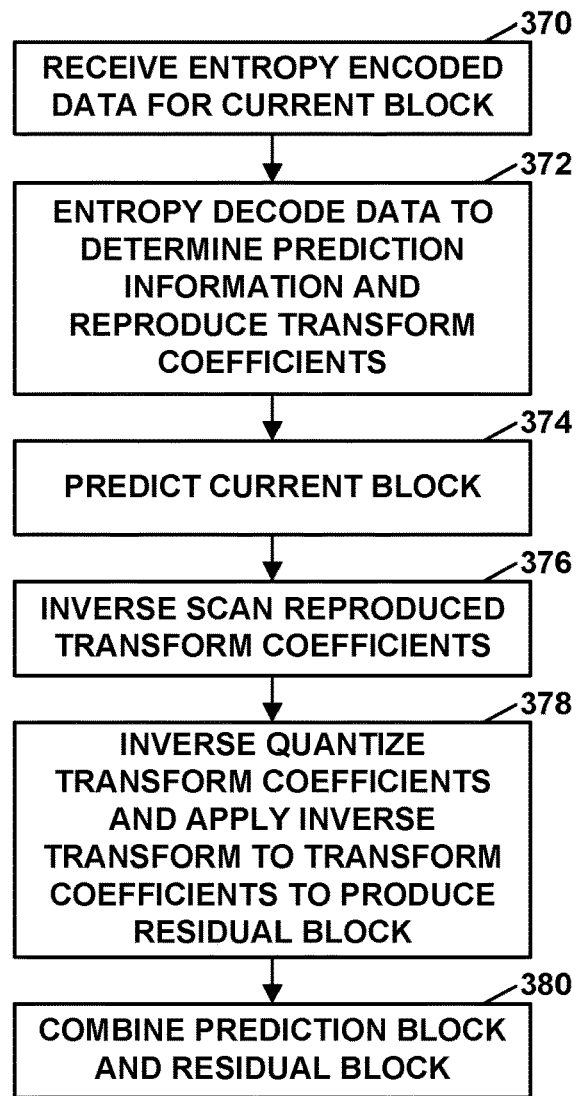
FIG. 7 is a flowchart illustrating an example of video decoding.

FIG. 7 is a flowchart illustrating an example method for decoding a current block of video data. The current block may comprise a current CU. Although described with respect to video decoder 300 (FIGS. 1 and 3), it should be understood that other devices may be configured to perform a method similar to that of FIG. 7.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). In some examples, as part of entropy decoding data, video decoder 300 may parse virtual boundary syntax elements indicative of virtual boundaries for a current picture, a current sub-picture being associated with the current picture.

Video decoder 300 may predict the current block (374), e.g., using an intra- or inter-prediction mode as indicated by the prediction information for the current block, to calculate a prediction block for the current block. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block (380). In some examples, while decoding video data video decoder 300 may perform one or more techniques of FIG. 5.

By updating virtual boundaries of a picture when a sub-picture of a picture having virtual boundaries is extracted, changing RPL constraints to accommodate the use case where a picture with multiple sub-pictures is predicted from an inter-layer reference picture with only one sub-picture, and adding a constraint that when a sub-picture is reordered, the sub-picture is treated as a picture, video decoding quality and/or video decoding performance may be improved.

This disclosure includes the following non-limiting examples.

Clause 1A. A method of coding video data, the method comprising: removing a first sequence parameter set (SPS) sub-picture identification (ID) syntax element from a referenced network abstraction layer (NAL) unit; removing a first picture parameter set (PPS) sub-picture ID syntax element from a referenced PPS NAL unit; determining whether a second SPS sub-picture ID syntax element is equal to a sub-picture index; based on the second SPS sub-picture ID syntax element not being equal to the sub-picture index, removing the second SPS sub-picture ID syntax element from an SPS; determining whether a second PPS sub-picture ID syntax element is equal to the sub-picture index; based on the second PPS sub-picture ID syntax element not being equal to the sub-picture index, removing the second PPS sub-picture ID syntax element from a PPS; refraining from signaling or parsing the first SPS sub-picture ID syntax element, the first PPS sub-picture ID syntax element, the second SPS sub-picture ID syntax element, and the second PPS sub-picture ID syntax element; and coding the video data.

Clause 2A. The method of clause 1A, further comprising removing virtual boundaries outside an extracted sub-picture.

Clause 3A. A method for coding video, the method comprising: determining whether a reference picture has more than one sub-picture; based on the reference picture having only one sub-picture, refraining from constraining a reference picture list (RPL); and coding the video data based on the RPL.

Clause 4A. The method of clause 3A, further comprising: determining whether a sub-picture of a current picture is treated as a picture; based on the sub-picture not being treated as the picture, refraining from constraining the RPL.

Clause 5A. The method of clauses 3A or 4A, further comprising: determining whether a current layer picture has more than 1 sub-picture; based on the current layer picture not having more than 1 sub-picture, refraining from constraining the RPL.

Clause 6A. A method for coding video data, the method comprising: determining whether a sub-picture of a current picture is reordered; based on the sub-picture being reordered, treating the sub-picture as a picture; and coding the video data based on the sub-picture being treated as the picture.

Clause 7A. The method of clause 6A, wherein determining whether a sub-picture is reordered comprises determining whether a collocated sub-picture in a reference picture has a different ID.

Clause 8A. The method of any combination of clauses 6A or 7A, further comprising signaling or parsing a syntax element, the syntax element being indicative of the sub-picture being treated as the picture.

Clause 9A. The method of any combination of clauses 6A-8A, further comprising: based on the sub-picture being reordered, treating all sub-pictures of the current picture as pictures.

Clause 10A. The method of any combination of clauses 6A-9A, further comprising: determining whether a slice in the sub-picture is a P slice or a B slice; and based on the slice being a P slice or a B slice and the sub-picture being reordered, treating the sub-picture as the picture.

Clause 11A. The method of any combination of clauses 1A-10A.

Clause 12A. The method of any of clauses 1A-11A, wherein coding comprises decoding.

Clause 13A. The method of any of clauses 1A-12A, wherein coding comprises encoding.

Clause 14A. A device for coding video data, the device comprising one or more means for performing the method of any of clauses 1A-13A.

Clause 15A. The device of clause 14A, wherein the one or more means comprise one or more processors implemented in circuitry.

Clause 16A. The device of any of clauses 14A and 15A, further comprising a memory to store the video data.

Clause 17A. The device of any of clauses 14A-16A, further comprising a display configured to display decoded video data.

Clause 18A. The device of any of clauses 14A-17A, wherein the device comprises one or more of a camera, a computer, a mobile device, a broadcast receiver device, or a set-top box.

Clause 19A. The device of any of clauses 14A-18A, wherein the device comprises a video decoder.

Clause 20A. The device of any of clauses 14A-19A, wherein the device comprises a video encoder.

Clause 21A. A computer-readable storage medium having stored thereon instructions that, when executed, cause one or more processors to perform the method of any of clauses 1-13.

Clause 1B. A method of decoding video data, the method comprising: extracting a current sub-picture from a bitstream of the video data; parsing virtual boundary syntax elements indicative of virtual boundaries for a current picture, the current sub-picture being associated with the current picture; updating the virtual boundaries based at least in part on the virtual boundary syntax elements; and decoding the current sub-picture based on the updated virtual boundaries.

Clause 2B. The method of clause 1B, further comprising: rewriting a picture parameter set (PPS) associated with the current sub-picture, wherein the rewritten PPS does not include PPS sub-picture identifiers for sub-pictures other than the current sub-picture.

Clause 3B. The method of clause 2B, further comprising: determining that the current sub-picture is to be processed as a picture; and determining that a reference layer has more than one sub-picture, wherein the rewriting the PPS is based on the current sub-picture being processed as the picture and the reference layer having more than one sub-picture.

Clause 4B. The method of any combination of clauses 1B-3B, further comprising: rewriting a sequence parameter set (SPS) associated with the current sub-picture, wherein the rewritten SPS does not include SPS sub-picture identifiers for sub-pictures other than the current sub-picture.

Clause 5B. The method of clause 4B, further comprising: determining that the current sub-picture is to be processed as a picture; and determining that a reference layer has more than one sub-picture, wherein the rewriting the SPS is based on the current sub-picture being processed as the picture and the reference layer having more than one sub-picture.

Clause 6B. The method of any combination of clauses 1B, 2B, or 4B, further comprising: determining that a reference picture for the current picture does not have more than one sub-picture; and based at least in part on the reference picture not having more than one sub-picture, adding the reference picture as an active entry in a reference picture list for the current sub-picture.

Clause 7B. The method of clause 6B, wherein the reference picture and the current picture are in a same layer.

Clause 8B. The method of any combination of clauses 1B-7B, further comprising: determining whether a reference picture for the current picture has more than one sub-picture; determining whether the current picture has more than one sub-picture; and based at least in part on the reference picture not having more than one sub-picture, the current picture not having more than one sub-picture, or the reference picture and the current picture both not having more than one sub-picture, adding the reference picture as an active entry in a reference picture list for the current sub-picture, wherein decoding the current sub-picture comprises decoding the current sub-picture based on the updated virtual boundaries and the reference picture list.

Clause 9B. The method of any combination of clauses 1B-2B, 4B, or 6B-8B, further comprising: determining that the current sub-picture is not to be processed as a picture; and based at least in part on the current sub-picture not being processed as the picture, adding a reference picture as an active entry in a reference picture list for the current sub-picture, wherein decoding the current sub-picture comprises decoding the current sub-picture based on the updated virtual boundaries and the reference picture list.

Clause 10B. The method of clause 9B, wherein the reference picture and the current picture are in a same layer.

Clause 11B. The method of any combination of clauses 1B-10B, further comprising: determining that the current sub-picture is reordered; and based at least in part on the current sub-picture being reordered, processing the current sub-picture as a picture.

Clause 12B. The method of clause 11B, wherein determining that the current sub-picture is reordered comprises: determining whether a collocated sub-picture in a reference picture has a same identifier as the current sub-picture; and determining that the current sub-picture is reordered based on the collocated sub-picture in the reference picture has the same identifier as the current sub-picture.

Clause 13B. The method of clause 11B or 12B, wherein the current picture comprises more than one sub-picture, and wherein the method further comprises: based at least in part on the current sub-picture being reordered, processing all sub-pictures of the current picture as pictures.

Clause 14B. The method of clause 11B or 12B, further comprising: determining whether a slice in the current sub-picture is a P slice or a B slice; and further based on the slice being a P slice or a B slice and the current sub-picture being reordered, processing the current sub-picture as the picture.

Clause 15B. The method of any of clauses 1B-8B or clauses 11B-14B, further comprising: determining that the current picture has more than one sub-picture; and determining that the current sub-picture is to be processed as a picture, wherein a sub-picture identifier of a collocated sub-picture in a reference picture for the current picture and the sub-picture identifier of the current sub-picture have a same value.

Clause 16B. The method of any of clauses 1B-11B or clauses 13B-14B, further comprising: determining that a reference picture for the current picture is an inter-layer reference picture having only one sub-picture, wherein a sub-picture identifier of a collocated sub-picture in the reference picture and the sub-picture identifier of the current sub-picture have different values.

Clause 17B. The method of any of clauses 1B-11B or clauses 13B-14B or clause 16B, further comprising: determining that the current picture has more than one subpicture; and determining that the current sub-picture is not to be processed as a picture, wherein a sub-picture identifier of a collocated sub-picture in a reference picture for the current picture and the sub-picture identifier of the current sub-picture have different values.

Clause 18B. A device for decoding video data, the device comprising: memory configured to store the video data; and one or more processors implemented in circuitry and communicatively coupled to the memory, wherein the one or more processors are configured to: extract a current sub-picture from a bitstream of the video data; parse virtual boundary syntax elements indicative of virtual boundaries for a current picture, wherein the current sub-picture is associated with the current picture; update the virtual boundaries based at least in part on the virtual boundary syntax elements; and decode the current sub-picture based on the updated virtual boundaries.

Clause 19B. The device of clause 18B, wherein the one or more processors are further configured to: rewrite a picture parameter set (PPS) associated with the current sub-picture, wherein the rewritten PPS does not include PPS sub-picture identifiers for sub-pictures other than the current sub-picture.

Clause 20B. The device of clause 19B, wherein the one or more processors are further configured to: determine that the current sub-picture is to be processed as a picture; and determine that a reference layer has more than one sub-picture, wherein the one or more processors are configured to rewrite the PPS is based on the determination that the current sub-picture is to be processed as the picture and the determination that the reference layer has more than one sub-picture.

Clause 21B. The device of any combination of clauses 18B-20B, wherein the one or more processors are further configured to: rewrite a sequence parameter set (SPS) associated with the current sub-picture, wherein the rewritten SPS does not include SPS sub-picture identifiers for sub-pictures other than the current sub-picture.

Clause 22B. The device of clause 21B, wherein the one or more processors are further configured to: determine that the current sub-picture is to be processed as a picture; and determine that a reference layer has more than one sub-picture, wherein the one or more processors rewrite the SPS based on the determination that the current sub-picture is to be processed as the picture and the determination that the reference layer has more than one sub-picture.

Clause 23B. The device of any combination of clauses 18B, 19B, or 21B, wherein the one or more processors are further configured to: determine that a reference picture for the current picture does not have more than one sub-picture; and based at least in part on the determination that the reference picture for the current picture does not have more than one sub-picture, add the reference picture as an active entry in a reference picture list for the current sub-picture.

Clause 24B. The device of clause 23B, wherein the reference picture and the current picture are in a same layer.

Clause 25B. The device of any combination of clauses 18B-24B, wherein the one or more processors are further configured to: determine whether a reference picture for the current picture has more than one sub-picture; determine whether the current picture has more than one sub-picture; and based at least in part on the determination whether a reference picture for the current picture has more than one sub-picture and the determination whether the current picture has more than one sub-picture reference picture add the reference picture as an active entry in a reference picture list for the current sub-picture, wherein at least one of the reference picture or the current picture does not have more than one sub-picture.

Clause 26B. The device of any combination of clauses 18B-19B, 21B, or 23B-25B, wherein the one or more processors are further configured to: determine that the current sub-picture is not to be processed as a picture; and based at least in part on the determination that the current sub-picture not to be processed as a picture, add a reference picture as an active entry in a reference picture list for the current sub-picture, wherein the one or more processors are configured to decode the current sub-picture based on the updated virtual boundaries and the reference picture list.

Clause 27B. The device of clause 26B, wherein the reference picture and the current picture are in a same layer.

Clause 28B. The device of any combination of clauses 18B-27B, wherein the one or more processors are further configured to: determine that the current sub-picture is reordered; and based at least in part on the determination that the current sub-picture is reordered, process the current sub-picture as a picture.

Clause 29B. The device of clause 28B, wherein to determine that the current sub-picture is reordered, the one or more processors are configured to: determine whether a collocated sub-picture in a reference picture has a same identifier as the current sub-picture; and determine that the current sub-picture is reordered based on the collocated sub-picture in the reference picture has the same identifier as the current sub-picture.

Clause 30B. The device of clause 28B or 29B, wherein the current picture comprises more than one sub-picture, and wherein the one or more processors are further configured to: based at least in part on the determination that the current sub-picture is reordered, process all sub-pictures of the current picture as pictures.

Clause 31B. The device of clause 28B or 29B, wherein the one or more processors are further configured to: determine that a slice in the current sub-picture is a P slice or a B slice; and further based on the determination that the slice in the current sub-picture is a P slice or a B slice and the determination that the current sub-picture is reordered, process the current sub-picture as the picture.

Clause 32B. The device of any of clauses 18B-25B or clauses 28B-31B, wherein the one or more processors are further configured to: determine that the current picture has more than one sub-picture; and determine that the current sub-picture is to be processed as a picture, wherein a sub-picture identifier of a collocated sub-picture in a reference picture for the current picture and the sub-picture identifier of the current sub-picture have a same value.

Clause 33B. The device of any of clauses 18B-28B or clauses 30B-31B, wherein the one or more processors are further configured to: determine that a reference picture for the current picture is an inter-layer reference picture with only one sub-picture, wherein a sub-picture identifier of a collocated sub-picture in the reference picture and the sub-picture identifier of the current sub-picture have different values.

Clause 34B. The device of any of clauses 18B-28B or clauses 30B-31B or clause 33B, wherein the one or more processors are further configured to: determine that the current picture has more than one sub-picture; and determine that the current sub-picture is not to be processed as a picture, wherein a sub-picture identifier of a collocated sub-picture in a reference picture for the current picture and the sub-picture identifier of the current sub-picture have different values.

Clause 35B. The device of any of clauses 18B-34B, further comprising: a display configured to display the video data.

Clause 36B. The device of any of clauses 18B-35B, wherein the device comprises a mobile telephone.

Clause 37B. A non-transitory computer-readable storage medium storing instructions, that, when executed, cause one or more processors to: extract a current sub-picture from a bitstream of the video data; parse virtual boundary syntax elements indicative of virtual boundaries for a current picture, wherein the current sub-picture is associated with the current picture; update the virtual boundaries based at least in part on the virtual boundary syntax elements; and decode the current sub-picture based on the updated virtual boundaries.

Clause 38B. A device for decoding video data, the device comprising: means for extracting a current sub-picture from a bitstream of the video data; means for parsing virtual boundary syntax elements indicative of virtual boundaries for a current picture, wherein the current sub-picture is associated with the current picture; means for updating the virtual boundaries based at least in part on the virtual boundary syntax elements; and means for decoding the current sub-picture based on the updated virtual boundaries.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    extracting a current sub-picture from a bitstream of the video data;
    parsing virtual boundary syntax elements indicative of virtual boundaries for a current picture, the current sub-picture being associated with the current picture;
    updating the virtual boundaries based at least in part on the virtual boundary syntax elements;
    determining that a reference picture for the current picture is an inter-layer reference picture having only one sub-picture;
    based on determining that the reference picture is an inter-layer reference picture having only one sub-picture, determining to exclude a constraint;
    based on determining to exclude the constraint, adding the reference picture as an active entry in a reference picture list for the current sub-picture; and
    decoding the current sub-picture based on the updated virtual boundaries and the reference picture list.

2. The method of claim 1, further comprising:
    rewriting a picture parameter set (PPS) associated with the current sub-picture, wherein the rewritten PPS does not include PPS sub-picture identifiers of sub-pictures other than the current sub-picture.

3. The method of claim 2, further comprising:
  determining that the current sub-picture is to be processed as a picture; and
  determining that a reference layer has more than one sub-picture,
  wherein the rewriting the PPS is based on the current sub-picture being processed as the picture and the reference layer having more than one sub-picture.

4. The method of claim 1, further comprising:
  rewriting a sequence parameter set (SPS) associated with the current sub-picture, wherein the rewritten SPS does not include SPS sub-picture identifiers of sub-pictures other than the current sub-picture.

5. The method of claim 4, further comprising:
  determining that the current sub-picture is to be processed as a picture; and
  determining that a reference layer has more than one sub-picture,
  wherein the rewriting the SPS is based on the current sub-picture being processed as the picture and the reference layer having more than one sub-picture.

6. The method of claim 1, wherein the reference picture and the current picture are in a same layer.

7. The method of claim 1, further comprising:
  determining whether a second reference picture for the current picture has more than one sub-picture;
  determining whether the current picture has more than one sub-picture; and
  based at least in part on the second reference picture not having more than one sub-picture, the current picture not having more than one sub-picture, or the second reference picture and the current picture both not having more than one sub-picture, adding the second reference picture as an active entry in the reference picture list for the current sub-picture.

8. The method of claim 1, further comprising:
  determining that the current sub-picture is not to be processed as a picture; and
  based at least in part on the current sub-picture not being processed as the picture, adding a second reference picture as an active entry in a reference picture list for the current sub-picture.

9. The method of claim 8, wherein the second reference picture and the current picture are in a same layer.

10. The method of claim 1, further comprising:
  determining that the current sub-picture is reordered; and
  based at least in part on the current sub-picture being reordered, processing the current sub-picture as a picture.

11. The method of claim 10, wherein determining that the current sub-picture is reordered comprises:
  determining whether a collocated sub-picture in a second reference picture has a same identifier as the current sub-picture; and
  determining that the current sub-picture is reordered based on the collocated sub-picture in the second reference picture having the same identifier as the current sub-picture.

12. The method of claim 10, wherein the current picture comprises more than one sub-picture, and wherein the method further comprises:
  based at least in part on the current sub-picture being reordered, processing all sub-pictures of the current picture as pictures.

13. The method of claim 10, further comprising:
  determining whether a slice in the current sub-picture is a P slice or a B slice; and
  further based on the slice being a P slice or a B slice and the current sub-picture being reordered, processing the current sub-picture as the picture.

14. The method of claim 1, further comprising:
  determining that the current picture has more than one sub-picture; and
  determining that the current sub-picture is to be processed as a picture,
  wherein a sub-picture identifier of a collocated sub-picture in a second reference picture for the current picture and the sub-picture identifier of the current sub-picture have a same value.

15. The method of claim 1,
  wherein a sub-picture identifier of a collocated sub-picture in the reference picture and the sub-picture identifier of the current sub-picture have different values.

16. The method of claim 1, further comprising:
  determining that the current picture has more than one sub-picture; and
  determining that the current sub-picture is not to be processed as a picture,
  wherein a sub-picture identifier of a collocated sub-picture in a second reference picture for the current picture and the sub-picture identifier of the current sub-picture have different values.

17. A device for decoding video data, the device comprising:
  memory configured to store the video data; and
  one or more processors implemented in circuitry and communicatively coupled to the memory, wherein the one or more processors are configured to:
    extract a current sub-picture from a bitstream of the video data;
    parse virtual boundary syntax elements indicative of virtual boundaries for a current picture, wherein the current sub-picture is associated with the current picture;
    update the virtual boundaries based at least in part on the virtual boundary syntax elements;
    determine that a reference picture for the current picture is an inter-layer reference picture having only one sub-picture;
    based on the determination that the reference picture is an inter-layer reference picture having only one sub-picture, determine to exclude a constraint;
    based on the determination to exclude the constraint, add the reference picture as an active entry in a reference picture list for the current sub-picture; and
    decode the current sub-picture based on the updated virtual boundaries and the reference picture list.

18. The device of claim 17, wherein the one or more processors are further configured to:
  rewrite a picture parameter set (PPS) associated with the current sub-picture, wherein the rewritten PPS does not include PPS sub-picture identifiers for sub-pictures other than the current sub-picture.

19. The device of claim 18, wherein the one or more processors are further configured to:
  determine that the current sub-picture is to be processed as a picture; and
  determine that a reference layer has more than one sub-picture, wherein the one or more processors are configured to rewrite the PPS based on the determination that the current sub-picture is to be processed as the picture and the determination that the reference layer has more than one sub-picture.

20. The device of claim 17, wherein the one or more processors are further configured to:
rewrite a sequence parameter set (SPS) associated with the current sub-picture, wherein the rewritten SPS does not include SPS sub-picture identifiers for sub-pictures other than the current sub-picture.

21. The device of claim 20, wherein the one or more processors are further configured to:
determine that the current sub-picture is to be processed as a picture; and
determine that a reference layer has more than one sub-picture,
wherein the one or more processors rewrite the SPS based on the determination that the current sub-picture is to be processed as the picture and the determination that the reference layer has more than one sub-picture.

22. The device of claim 17, wherein the reference picture and the current picture are in a same layer.

23. The device of claim 17, wherein the one or more processors are further configured to:
determine whether a second reference picture for the current picture has more than one sub-picture;
determine whether the current picture has more than one sub-picture; and
based at least in part on the second reference picture for the current picture not having more than one sub-picture, the current picture not having more than one sub-picture or the second reference picture and the current picture both not having more than one sub-picture, add the second reference picture as an active entry in the reference picture list for the current sub-picture.

24. The device of claim 17, wherein the one or more processors are further configured to:
determine that the current sub-picture is not to be processed as a picture; and
based at least in part on the determination that the current sub-picture not to be processed as a picture, add a second reference picture as an active entry in a reference picture list for the current sub-picture.

25. The device of claim 24, wherein the second reference picture and the current picture are in a same layer.

26. The device of claim 17, wherein the one or more processors are further configured to:
determine that the current sub-picture is reordered; and
based at least in part on the determination that the current sub-picture is reordered, process the current sub-picture as a picture.

27. The device of claim 26, wherein to determine that the current sub-picture is reordered, the one or more processors are configured to:
determine whether a collocated sub-picture in a second reference picture has a same identifier as the current sub-picture; and
determine that the current sub-picture is reordered based on the collocated sub-picture in the second reference picture having the same identifier as the current sub-picture.

28. The device of claim 26, wherein the current picture comprises more than one sub-picture, and wherein the one or more processors are further configured to:
based at least in part on the determination that the current sub-picture is reordered, process all sub-pictures of the current picture as pictures.

29. The device of claim 26, wherein the one or more processors are further configured to:
determine that a slice in the current sub-picture is a P slice or a B slice; and
further based on the determination that the in the current sub-picture is a P slice or a B slice and the determination that the current sub-picture is reordered, process the current sub-picture as the picture.

30. The device of claim 17, wherein the one or more processors are further configured to:
determine that the current picture has more than one sub-picture; and
determine that the current sub-picture is to be processed as a picture,
wherein a sub-picture identifier of a collocated sub-picture in a second reference picture for the current picture and the sub-picture identifier of the current sub-picture have a same value.

31. The device of claim 17,
wherein a sub-picture identifier of a collocated sub-picture in the reference picture and the sub-picture identifier of the current sub-picture have different values.

32. The device of claim 17, wherein the one or more processors are further configured to:
determine that the current picture has more than one sub-picture; and
determine that the current sub-picture is not to be processed as a picture,
wherein a sub-picture identifier of a collocated sub-picture in a second reference picture for the current picture and the sub-picture identifier of the current sub-picture have different values.

33. The device of claim 17, further comprising:
a display configured to display the video data.

34. The device of claim 17, wherein the device comprises a mobile telephone.

35. A non-transitory computer-readable storage medium storing instructions, that, when executed, cause one or more processors to:
extract a current sub-picture from a bitstream of the video data;
parse virtual boundary syntax elements indicative of virtual boundaries for a current picture, wherein the current sub-picture is associated with the current picture;
update the virtual boundaries based at least in part on the virtual boundary syntax elements;
determine that a reference picture for the current picture is an inter-layer reference picture having only one sub-picture;
based on the determination that the reference picture is an inter-layer reference picture having only one sub-picture, determine to exclude a constraint;
based on the determination to exclude the constraint, add the reference picture as an active entry in a reference picture list for the current sub-picture; and
decode the current sub-picture based on the updated virtual boundaries and the reference picture list.

* * * * *